April 24, 1956 J. E. KENNEDY 2,743,012
METHOD OF RECLAIMING FIBROUS MATERIAL FROM WASTE DUMPS
Filed Jan. 12, 1952
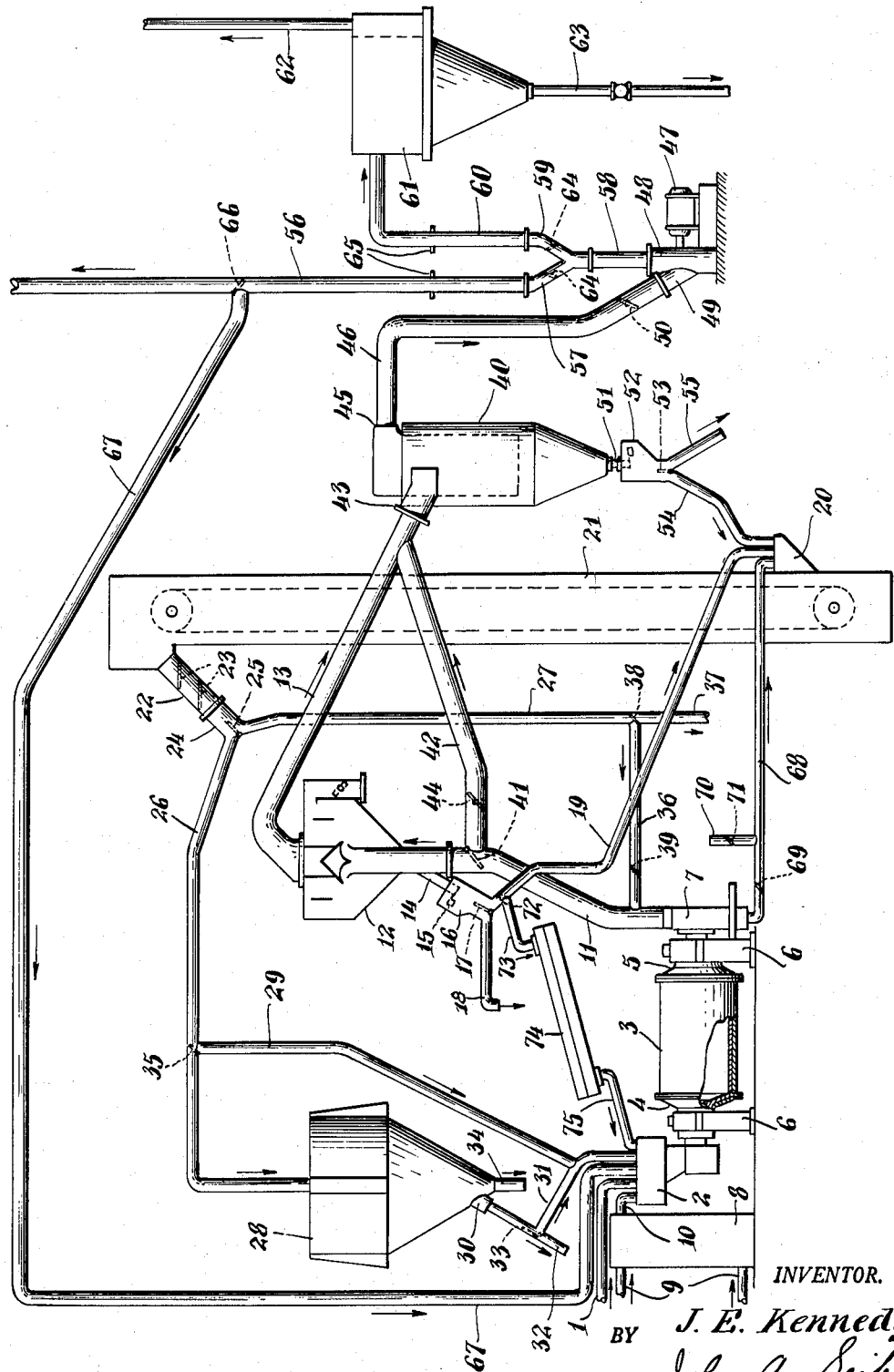
INVENTOR.
J. E. Kennedy
BY John A. Seifert
ATTORNEY

United States Patent Office 2,743,012
Patented Apr. 24, 1956

2,743,012

METHOD OF RECLAIMING FIBROUS MATERIAL FROM WASTE DUMPS

Joseph E. Kennedy, New York, N. Y.

Application January 12, 1952, Serial No. 266,204

1 Claim. (Cl. 209—11)

This invention relates to a method of reclaiming fibrous material from waste dumps, such as waste dumps of asbestos.

The object of the invention is to recover salable fibrous material from waste dumps by suspending the waste fibrous material in a heated air stream and passing the suspended material through a tumbling zone and subsequently through a separating zone where the salable fibrous material is recovered.

Other objects and advantages of the invention will be described hereinafter.

The drawing accompanying and forming a part of this application shows in a diagrammatic manner the apparatus for carrying out the method of reclaiming waste fibrous material.

In carrying out the invention, the waste fibrous material, such as asbestos, is delivered by a pipe 1 to a feed box 2 of a drum 3 having hollow trunnions 4 and 5 at the opposite ends rotatably mounted on bearings 6. The trunnion 4 consititutes the feed end of the drum 3 and receives the waste material from the feed box 2 delivered by the pipe 1. The drum 3 is rotated by suitable means, such as an electric motor, not shown, and contains no grinding media, such as balls or rods.

The waste material is drawn through the rotating drum 3 by a suction fan enclosed in a casing 7 having an inlet connected in communication with the trunnion 5 constituting the discharge end of the drum. The waste material is tumbled about in the drum by the rotation of the drum while being drawn through the drum. During the tumbling operation, the moisture in the waste material is removed by heating the air being drawn through the trunnion 4 by the fan in casing 7. This is accomplished by passing said air through a furnace 8 having inlets 9 and an outlet 10 connected in communication with the feed box 2.

The waste material, which has been tumbled and heated, is drawn from the drum 3 through trunnion 5 by the fan in casing 7 and conveyed by the air stream through a conduit 11 to a radial-flow-classifier or separator 12 wherein the separated or reclaimed material is discharged through a conduit 13. The incompletely treated material and residue is discharged from the separator 12 through an outlet pipe 14 having a gate or valve 15 at the end entering a juncture box 16 having an adjustable gate 17 for directing the residue to a discharge conduit 18 or a conveying conduit 19. The discharge conduit 18 is for the purposes of taking samples and weighing the incompletely treated material and residue. The conduit 19 conveys the incompletely treated material and residue to a chute 20 for delivering said material and residue to an elevator 21 having at the top a discharge chute 22 arranged with traps 23. The discharge chute 22 is arranged with a juncture box 24 having an adjustable gate 25 for directing the discharged material either into a conveying conduit 26 or a discharge conduit 27. The conduit 26 returns the material to the feed end of the drum either through a separator 28 or a conduit 29. The separator 28 is arranged with an outlet 30 for the separated material connected in communication with the feed box 2 through a pipe 31 and having an extension 32 for the purposes of taking samples and weighing. The discharge of the material from outlet 30 is directed either to the pipe 31 or extension 32 by a switch valve 33. The separator 28 is also arranged with a discharge 34 for the residue which may also be weighed and sampled. The conduit 29 is connected in communication with the pipe 31 to deliver all of the material from the elevator 21 directly to the feed box 2. The material in the conduit 26 is directed either to the separator 28 or the conduit 29 by a switch valve 35. The conduit 27 conveys the material from the elevator 21 to either the conduit 11 through a pipe 36 to be reclassified or to a place to take samples and weigh said material through pipe 37. The material in conduit 27 is directed either to the pipe 36 or pipe 37 by a switch valve 38. The flow of material through pipe 36 to conduit 11 is controlled by a damper 39 in the pipe 36.

The residue in conduit 19 may be directed by switch valve 72 to a branch pipe 73 to convey said residue to the upper end of air vented slide 74 having the lower end connected to a pipe 75 discharging the residue to the feed box 2.

The material in conduit 11 may be diverted from the radial-flow-separator 12 to a cyclone separator 40 by a switch valve 41 in conduit 11 directing the material either to the separator 12 or to a conduit 42 leading to and discharging the material to a portion of the conduit 13 adjacent to the end of said conduit 13 connected to an inlet 43 of the separator 40. The flow of the material through a conduit 42 is controlled by a damper 44.

The material delivered to the cyclone separator 40 either from the radial-flow-separator 12 or directly from the discharge end of the drum 3 is separated into fine and coarse material and the fine material is discharged through an outlet 45 of said separator 40 and conveyed by a conduit 46 under the force of a suction fan driven by a motor 47 in a casing 48 having an inlet 49 to which the outlet end of the conduit 46 is connected. The flow of separated material through the conduit 46 is regulated by a damper 50 in said conduit. The residue of the material in the cyclone 40 is discharged through a valve controlled outlet 51 into a juncture box 52 having a pivoted gate 53 to direct said residue either into a pipe 54 leading to and discharging said residue into the chute 20 or into a pipe 55 for taking samples and weighing said residue.

The fan in casing 48 will deliver the treated fibrous material to a place of storage, not shown, through a conduit 56 connected to one discharge leg portion 57 of a Y-coupling connected to the outlet 58 of the fan casing 48. The other discharge leg portion 59 of the Y-coupling is connected by a conduit 60 in communication with the inlet of a dust-filter 61 having an outlet 62 for the fully treated fibrous material and a valve controlled outlet 63 for the residue. The outlet 62 delivers the material to the place of storage. The material may be discharged simultaneously to the conduits 56 and 60, or only to one of said conduits by adjusting dampers 64 in the leg portions 57 and 59. The quality of the material being discharged through the conduits 56 and 60 is determined by pilot tubes 65 in said conduits.

If the material being discharged through the conduit 56 is not of the required quality, it may be returned to the feed box 2 for the further treatment by actuating a switch valve 66 to close the conduit 56 to the place of storage and open communication between said conduit 56 to a conduit 67 leading to the feed box 2.

The discharge end of the drum 3 may be arranged to direct the coarse heavy material to flow by gravity along a conduit 68 to the chute 20. The flow of said heavy coarse material is regulated in the conduit 68 by a damper flow 69. The samples taken from pipe 55 may be delivered to the conduit 68 through a branch pipe 70 connected to the conduit 68 and having a damper 71 therein.

Having thus described my invention, I claim:

The method of reclaiming waste fibrous material which consists of passing the waste fibrous material in a heated air stream through a tumbling zone having a feed end and a discharge end, separating coarse heavy material from the fibrous material suspended in the heated air stream at the discharge end of the tumbling zone, and simultaneously returning said coarse heavy material to the feed end of the tumbling zone and subsequently passing the heated fibrous material suspended in the heated air stream through a series of connected separating zones spaced from the discharge end of the tumbling zone and from each other.

References Cited in the file of this patent

UNITED STATES PATENTS

| | | |
|---|---|---|
| 486,806 | Batcheller | Nov. 22, 1892 |
| 1,216,555 | Engel | Feb. 20, 1917 |
| 1,317,852 | Ashenhurst | Oct. 7, 1919 |
| 1,611,791 | Stockton | Dec. 21, 1926 |
| 1,630,992 | Waterman | May 31, 1927 |
| 1,729,424 | Harshaw | Sept. 24, 1929 |
| 1,912,910 | Neuman et al. | June 6, 1933 |
| 1,986,301 | Stockton | Jan. 1, 1935 |
| 2,090,187 | Credo | Aug. 17, 1937 |
| 2,200,822 | Crites | May 14, 1940 |
| 2,450,843 | Sherman | Oct. 5, 1948 |
| 2,592,231 | Alstott | Apr. 8, 1952 |

FOREIGN PATENTS

| | | |
|---|---|---|
| 1,071 | Great Britain | of 1854 |